United States Patent
Polcyn

Patent Number: 6,058,415
Date of Patent: May 2, 2000

[54] SYSTEM AND METHOD FOR INTEGRATION OF COMMUNICATION SYSTEMS WITH COMPUTER-BASED INFORMATION SYSTEMS

[75] Inventor: Michael J. Polcyn, Allen, Tex.

[73] Assignee: InterVoice Limited Partnership, Reno, Nev.

[21] Appl. No.: 08/899,953

[22] Filed: Jul. 24, 1997

[51] Int. Cl.[7] .................................................. G06F 15/15
[52] U.S. Cl. .......................... 709/200; 709/202; 709/206; 709/227; 709/228; 709/9; 709/10; 379/90.01
[58] Field of Search ................................... 709/200–203, 709/206, 212–213, 223–224, 227–229, 246, 249; 707/4–10, 100–104; 705/9, 26–27; 713/200–202; 379/93, 88

[56] References Cited

U.S. PATENT DOCUMENTS

| | | | |
|---|---|---|---|
| 5,329,578 | 7/1994 | Brennan et al. | 379/88.19 |
| 5,408,518 | 4/1995 | Yunoki | 379/67.1 |
| 5,473,143 | 12/1995 | Vak et al. | 235/380 |
| 5,483,587 | 1/1996 | Hogan et al. | 379/202 |
| 5,483,588 | 1/1996 | Eaton et al. | 379/555 |
| 5,493,692 | 2/1996 | Theimer et al. | 709/206 |
| 5,559,875 | 9/1996 | Bieselin et al. | 379/202 |
| 5,678,041 | 10/1997 | Baker et al. | 709/229 |
| 5,719,928 | 2/1998 | Pinnell et al. | 379/202 |
| 5,727,048 | 3/1998 | Hiroshima et al. | 379/93.12 |
| 5,815,554 | 9/1998 | Burgess et al. | 379/93.01 |
| 5,826,019 | 10/1998 | Ronstrom | 709/201 |
| 5,855,006 | 12/1998 | Huemoeller et al. | 705/9 |
| 5,864,852 | 1/1999 | Luotonen | 709/246 |
| 5,923,846 | 7/1999 | Gage et al. | 379/93.12 |

*Primary Examiner*—Ahmad F. Matar
*Assistant Examiner*—Bharat Barot
*Attorney, Agent, or Firm*—Fulbright & Jaworski L.L.P.

[57] ABSTRACT

A system and method for providing data communication between an information system, such as a LAN, and a communication system, such as a PBX operating under control of an automatic call routing system, is disclosed. According to a preferred embodiment, data as to a particular LAN users schedule, as reflected in an electronic calendar application, is used to properly route calls via the automatic call routing system. Alternative embodiments providing for the scheduling of events in the electronic calendar as well as the dissemination of information through the communication system are also disclosed.

40 Claims, 4 Drawing Sheets

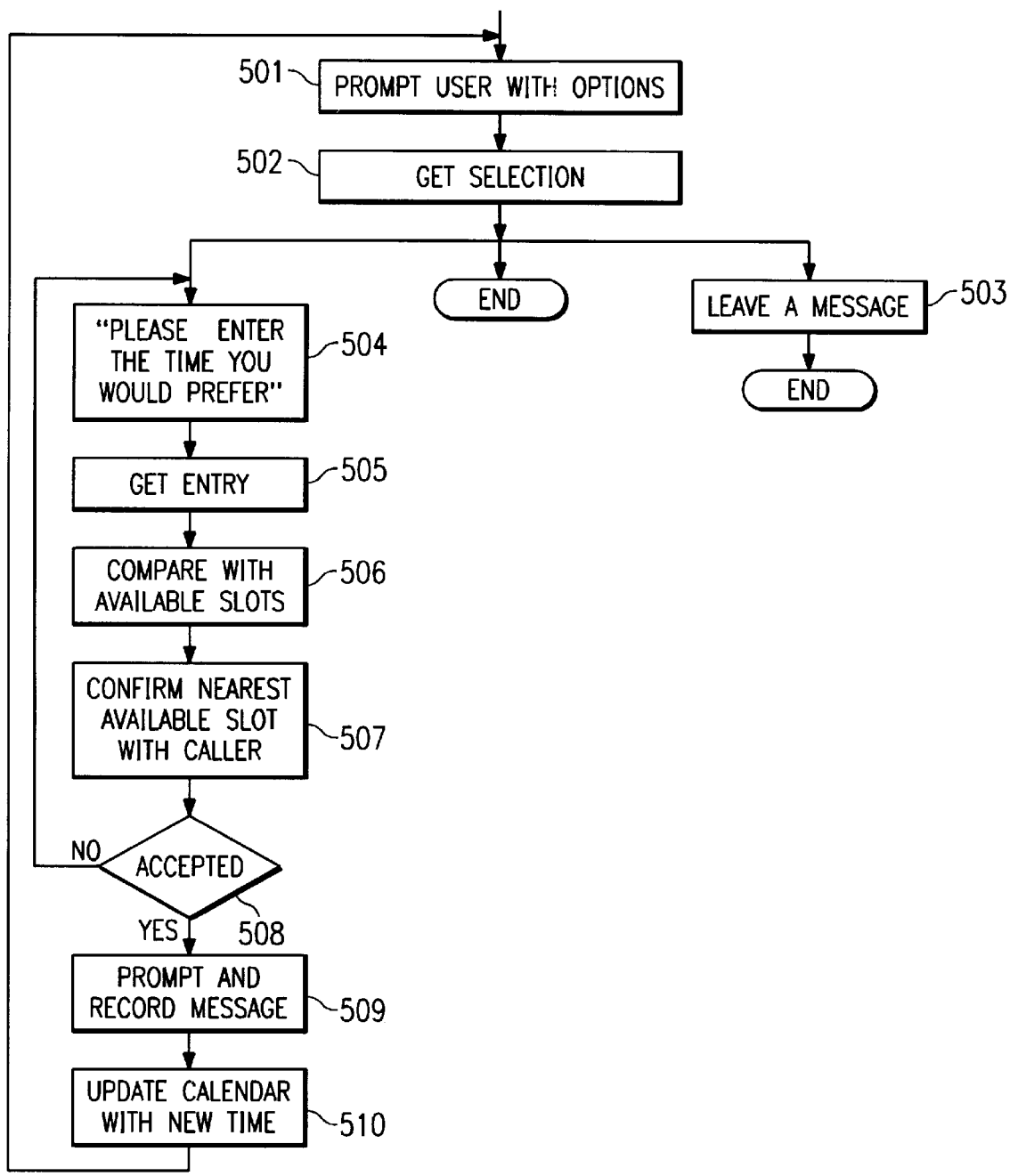

SYSTEM AND METHOD FOR INTEGRATION OF COMMUNICATION SYSTEMS WITH COMPUTER-BASED INFORMATION SYSTEMS

TECHNICAL FIELD OF THE INVENTION

The present invention is related generally to voice mail and call processing systems. More particularly, the invention is directed to integration of voice mail and call processing systems with computer based applications such as an electronic calendar.

BACKGROUND OF THE INVENTION

In a typical office environment, local area network (LAN) based applications, such as scheduling and time management calendar packages, are commonly used. These applications are generally personal computer (PC) or LAN work station executable packages, and can provide a user such features as presenting an electronic representation of a calendar, schedule, or the like. Moreover, the user may be allowed to alter the information presented, such as schedule certain events, just as she/he would on a hard copy, or paper, version of the representation.

The benefit of these LAN based applications is that their information may be shared, such as where multiple users share their individual calendars. As a result, users can determine if others are available at certain times, they can schedule meetings with other people, they can make appointments on another user's calendar, or the like. Such systems present an efficient method of interacting with a work group and, thus, are used quite often in the office setting.

Likewise, communication systems, such as voice mail systems and automatic call routing systems, are commonly used in office environments. Generally, voice mail systems allow callers to leave a message if the call is not answered by a user or if the user's line is busy. Such systems typically provide for user or administrator definition of a limited number of features. For example, a user can typically direct the voice mail system to present a custom greeting message.

Likewise, an administrator or user can typically direct the automatic call routing system to route calls to a voice mail system when it detects a user on the phone to which a call is initially directed. Additionally, a user might be allowed to direct the automatic call routing system to forward incoming calls initially intended for the user's regular telephone number to another number.

Although providing limited user configurability, as described above, the communication systems in common use today provide very little user control other than modification of some basic user parameters such as to customize the interface that is presented to callers, the order of phone numbers to which to direct calls, etc. Furthermore, as these systems are often discrete systems, customization of such parameters often requires duplicative efforts on the part of the user in addition to requiring knowledge of the operation and programming of distinct system.

Information provided by a user in the aforementioned PC or LAN applications might also be relevant to the communication system. However, since these applications and the telephony systems do not provide an acceptable form of interface, the user must provide the pertinent information to both the computer application as well as the communication system.

Clearly these systems, although commonly used, could be much more efficient if linked together. Therefore, a need exists in the art for the linking, or interfacing, of communication and information processing systems so as to more efficiently utilize relevant information therebetween.

Additionally, a need exists in the art for a system and method which provides real-time interaction between information systems and communication systems so as to enable single entry input of information with respect to both such systems.

A further need in the art exists for the interface between such disparate systems to moderate intercommunication so as to provide interfacing without the need for significant modification of existing general purpose systems.

SUMMARY OF THE INVENTION

These and other objects, features and technical advantages are achieved by a system and method in which a communication system, such as a voice mail and/or automatic call routing system (a one number call system), takes advantage of the fact that computer applications having information relevant to call handling services stored therein, such as calendar programs, exist. Accordingly, the present invention looks at, in real-time on a call-by-call basis, information available within such applications. For example, a preferred embodiment the present invention determines the availability of individuals for taking calls through reference to electronic calendar information. As such, call handling determinations may be accurately made without ever necessarily presenting that call to the user's telephone.

For instance, if a user is scheduled in a meeting, as indicated on their electronic calendar, there is typically no reason for the automatic call routing system to attempt to call to this individual's office. The automatic call routing system could instead respond to the caller by presenting a message such as, "Mr. Smith is in a meeting right now. Do you care to leave a message?".

Additionally, according to the present invention, a user may indicate in a particular computer application, such as the aforementioned calendar program, numbers at which she/he might be reached. The automatic call routing system may then take advantage of these numbers and place calls back through the network in order to reach the user at some location other than the office.

Preferably, the interaction provided between the communication system and the computer application is accomplished with a minimum of modification of either system. For example, where a particular computer application is utilized for which its data structure is known, the present invention may be adapted to parse from this data structure the data necessary for interfacing with the communication system without necessitating any changes within the computer application itself. Likewise, the present invention may supply this information to the communication system through an existing interface, such as a preestablished administrator interface, so as to require no modification of this system. Of course, provision of information in the reverse channel may be similarly accomplished so as to require no modification of existing systems.

Therefore, it shall be appreciated that a technical advantage of the present invention is that a useful link, or interface, is provided between communication and information processing systems which are commonly deployed in an office environment so as to more efficiently utilize relevant information therebetween.

A further technical advantage is presented in that the present invention provides real-time interaction between a computer application and a communication system so as to enable single entry input of information useful in both such systems.

A still further technical advantage is realized through the present invention's ability to provide an interface between discrete and disparate systems without the need for their modification.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a flow diagram of the solicitation of information system data from a communication system caller according to a preferred embodiment of the present invention.

DESCRIPTION OF THE PREFERRED EMBODIMENTS

Figure 2:
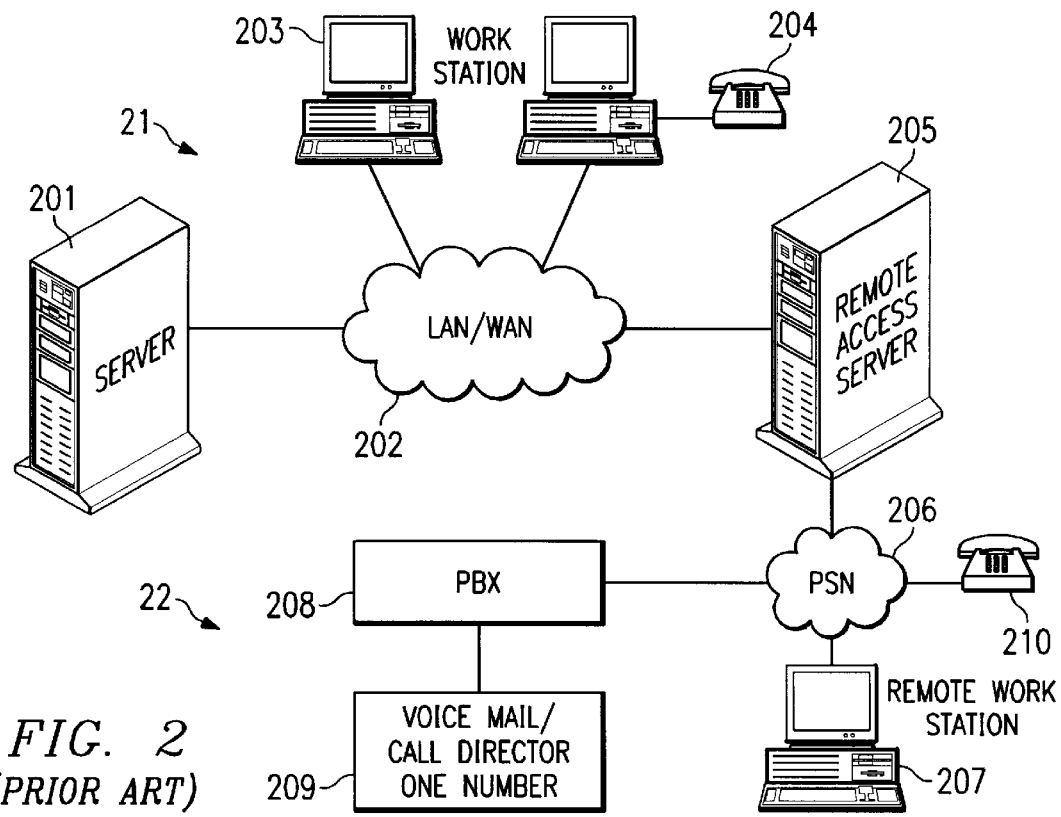
FIG. 2 illustrates a typical prior art deployment of discrete office systems including a telephony based communication system and a computer network based information system.

In order to better understand the features and benefits of the present invention, a brief description of a typical deployment of prior art office systems is given. Directing attention to FIG. 2, an exemplary deployment of an information system 21 and communication system 22 is illustrated.

In the prior art, a typical office information system, such as information system 21, is comprised of a local area network (LAN) or wide area network (WAN) 202 connecting work stations 203 and server 201. In many systems some form of remote access server 205 is connected to the LAN/WAN 202 to allow access between system 21 and a remote work station 207, such as through public switched network (PSN) 206. This allows remote work station 207 to share files and/or information with work stations 203 and/or server 201. Typically, individual work stations 203 can also access PSN 206, either through remote access server 205 or by a direct connection, such as a local work station modem. By connecting to PSN 206, work stations 203 can access other networks, databases, the Internet, or the like.

Generally, an office environment includes a communication system, such as telephone communication system 22, connected to PSN 206, such as through PBX switching system 208. Call processing system 209 may be attached to PBX 208 to run voice mail, call director and one number applications. Generally, these telephone communication applications are managed independently from the other office systems. In most cases, PBX 208 and call processing system 209 are not integrated with the office information system, or any other portion of the office environment for that matter.

Presently, there are no standards or systems available which provide an integrated solution to allow communication system 21 to take advantage of information available within information system 22, such as a LAN based or work station based calendar application. For example, in the voice mail, call director and one number systems that exist today, there are generally only two types of interfaces which are used to configure or manage those systems. One such interface provides a management or maintenance interface, allowing for initial system configuration and parameter setting. This interface is typically used by a system administrator or manager. The other system interface is telephone based. This allows users to control their individual voice mail or call director applications. For example, each user can set specific options, such as directing where calls should be routed or selecting a personalized greeting message.

Occasionally, PC based applications are provided which allow access to voice mail and call director systems via the Internet or direct connection. However, these PC based applications are separate from the other work station or LAN based applications, i.e., they do not provide a common interface for data intercommunication. For example, even where a PC based application provides access to a communication system in the prior art, data already available within an electronic calendar application operating upon the same PC system would not be available to the communication system without re-entry. This so because the calendar application, or other PC based application, is not integrated with the communication system. Therefore, if the user were leaving on vacation, he would not only mark his planned absence on the calendar, but he would also need to update the voice mail system to indicate that the system should play a customized greeting message or to forward his calls appropriately.

Figure 1:
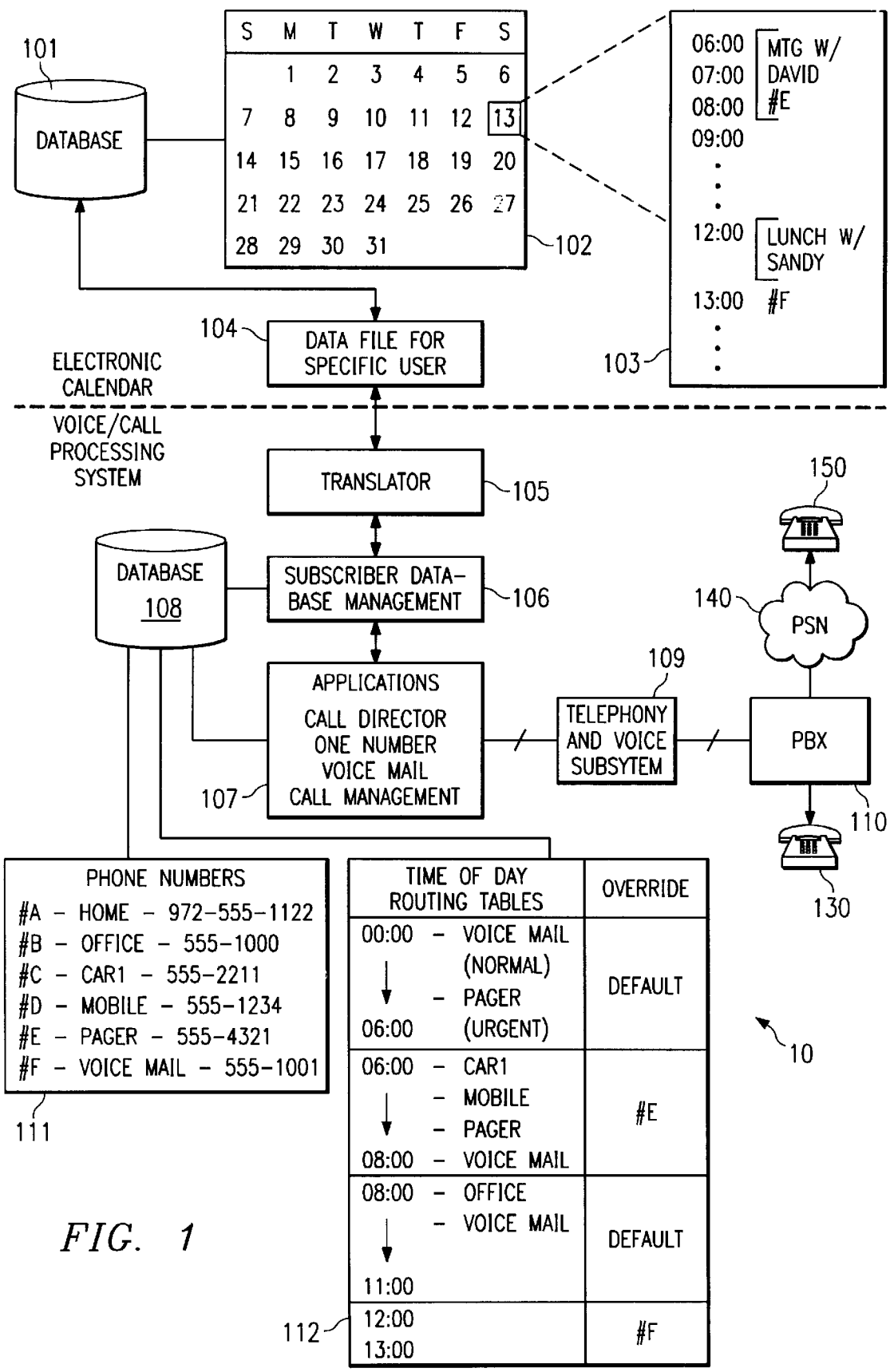
FIG. 1 illustrates a preferred embodiment of the present invention.

However, according to the present invention, information available within information system 22, such as within a calendar application, can be provided in real time to a voice mail, call director, one number system or other communication system application so that the communication system can make intelligent determinations, such as call routing decisions and determinations as to user availability. Accordingly, the present invention brings these two technologies together to operate as a single system, a preferred embodiment of which is illustrated in FIG. 1.

It shall be appreciated that the present invention may be embodied within any number of processing systems. For example, the present invention may be embodied within a general purpose processor-based system interfaced so as to provide a data interface between information system 21 and communication system 22. Alternatively, the present invention may be embodied within communication system 22 having some available processing and storage capacity, provided the communication system includes, or is adaptable to include, a data interface with information system 21.

System 10 of the present invention integrates a typical voice mail and call processing system, or other communication system application, with a PC or LAN based application, such as an electronic calendar. Database 101 is preferably part of, or otherwise connected to, LAN 202 illustrated in FIG. 2 in order that individual files or information may be shared among system users or devices. The files stored on database 101 may include, for example, those associated with an electronic calendar containing calendar schedule information. It is such electronic calendar files and information that shall be discussed herein with reference to a preferred embodiment of the present invention. However, it shall be appreciated that the present invention is not limited to the use of electronic calendar information and, in fact, is adaptable for integration of any number of information systems with communication systems.

There are a number of LAN or PC based calendar applications available on the market from different vendors. Typically, each such calendar application uses a different, or proprietary, data format such that there is no standardized format for the exchange of data among these applications. Therefore, the calendar data stored in database 101 can be in any number of formats depending upon the specific electronic calendar application used.

Generally, an electronic calendar application allows the user to select a specific day, month and year and then displays a chronological list of events for the chosen day. The events will usually relate to specific meetings or appointments, or to times when the user will or will not be in his/her office. The duration of the scheduled events may vary from a number of minutes, for example denoting a short meeting, to whole weeks or months, denoting such events as business trips or vacations.

For example, monthly calendar 102 is a representation of a calendar that may be displayed by a PC or personal digital assistant calendar application. Daily schedule 103 is a representation of the specific events scheduled for a particular day by a user. Database 101 contains calendar files storing the above information with respect to each such user for later use by this or other users, such as within data file 104. Moreover, these files are typically updated each time a user alters the events scheduled in the electronic calendar. As such, not only may any user keep track of events scheduled with respect to her/himself, but she/he may also keep apprised of other user's scheduled events.

Taking advantage of this cache of information with respect to events scheduled for individual users, and thus their availability within the office, the present invention operates to extract specific information corresponding to a particular user. Translator 105 of the present invention provides a useful data interface between the electronic calendar application and voice mail or call processing system by extracting user information from database 101 and providing that information to a communication system database, such as through subscriber database management 106.

Translator 105 is preferably adapted to readily recognize the data structure of data file 104 of the particular calendar application used. For example, translator 105 may be provided with information specific to the data structure of a particular calendar application and thereby open data file 104 and directly extract information useful in the operation of the communication system. Alternatively, translator 105 may open data file 104 and browse its contents in order to intelligently parse useful information therefrom. Upon extracting information from data file 104, translator 105 reformats the data into a format that can be used by a communication system such as a voice mail or call processing system.

Subscriber database management program 106 may store the user information extracted by translator 105 in database 108, such as for future use by the communication system. Additionally, subscriber database management program 106 may provide the data directly to communication system applications 107 for real-time use.

Accordingly, when changes are made within a PC application, such as to calendar 102 or schedule 103, and stored within data file 104, translator 105 extracts and reformats the new information. Thereafter, subscriber database management program 106 modifies parameters of the voice mail or call processing applications 107 to ensure applications 107 are properly executed according to the updated information.

Figure 3:
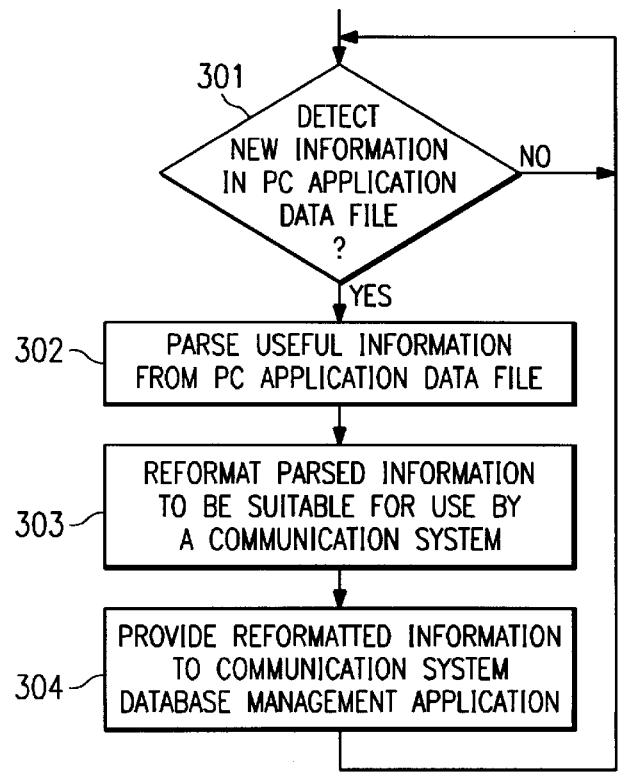
FIG. 3 is a flow diagram of the translation of data from an information system to a communication system according to a preferred embodiment of the present invention.

A preferred embodiment of the steps of translator 105 is illustrated as a flow diagram in FIG. 3. At step 301, translator 105 monitors data file 104 for the appearance of new information with respect to a user. It shall be appreciated that monitoring for new information may be accomplished by any number of methods known in the art. For example, translator 105 may reference file directory or file attribute information in order to detect a change or alteration of information within data file 104. Alternatively, translator 105 may maintain information with respect to the contents of data file 104 for periodic comparison and, thus, detection of modification.

It shall be appreciated that if no new information is detected in data file 104 there is no need for translator 105 to extract information from data file 104. Therefore, in the absence of new information, translator 105 continues to monitor data file 104 for modified information. Of course, where it is advantageous to provide the communication system data when not having been updated, translator 105 can extract the appropriate information regardless of the aforementioned determination.

Upon detecting new information within data file 104, translator 105 proceeds to parse or extract any information useful to the communication system from data file 104 (step 302). Information parsing according to a preferred embodiment of translator 105 operates to disregard PC application information which is not desired or not useful to the operation of the associated communication system.

Precisely what information, if any, which is or is not desired or useful to the communication system will depend on a number of factors. For example, it is expected that time information will generally be useful to the communication system. Therefore, the fact that the user is demarcated as busy during the time blocks from 6:00 a.m. to 9:00 a.m. and from 12:00 p.m. to 13:00 p.m. in calendar entry 103 of FIG. 1 will typically be parsed for provision to the communication system. However, calendar entry 103 also includes information which may be superfluous. The fact that the user is in a meeting with David or at lunch with Sandy may or may not be useful.

Depending on the level of sophistication desired of the information interchanged by the information and communication systems, information, such as the aforementioned lunch with Sandy, may be utilized in a number of ways. For example, the fact that the user is scheduled to be at lunch, as opposed to a meeting or other business related event, may be utilized by the present invention in order to make determinations as to the content of information to be provided to the communication system. As discussed in more detail below, the present invention may provide an alternate phone number, such as a pager number, knowing that an important business function would not be disrupted by a forwarded call during the scheduled event. Similarly, the fact that the meeting is scheduled with David may indicate that it is desired to forward calls to an extension associated with David. Accordingly, the translator and database management application of the present invention operate to properly parse and supplement or manipulate the information to result in the appropriate functionality.

After a determination of information to be extracted from the data file, reformatting of data is performed at step 303 for provision to the communication system. Depending on the file and data structure of the PC application, the data stored in data file 104 may appear in a form foreign to the communication system. Translator 105 operates to manipulate the parsed information to be presented in a form compatible with the communication system. For example, the time information illustrated in calendar entry 103 is shown in twenty-four hour format (military time) rather than twelve hour format. Therefore, where a communication system requires such information to be provided in an alternative format, translator 105 manipulates the data to result in the desired information format.

Similarly, particular instruction strings, whether embodied in particular command structures, character sets, or even tone sequences, may be required in order to provide the information to the communication system. Accordingly, translator 105 provides information formatting to meet such communication system requirements at step 303.

Thereafter, at step 304, the translator provides the reformatted information to the communication system database management system of the present invention. Of course, rather than being discrete modules as illustrated in FIG. 1, translator 105 and database management system 106 may be embodied as a single unit.

Although the steps for extracting information from a single data file are illustrated, it shall be appreciated that the present invention may be utilized to extract such information from a plurality of files. For example, it is envisioned that multiple calendar data files, each being associated with a different user, may be utilized in order to provide user information to a communication system. Here the steps illustrated in FIG. 3 may simply be repeated for each such data file.

Of course, to properly associate the data file information with a particular user of the communication system, in order that the present invention may associate information contained therein with the particular communication devices for which routing changes should be made, correlation information may need to be provided. For example, a correlation table (not shown) could be created which associates a particular data file of the information system with a particular telephone extension of the communication system. Likewise, particular data sets stored within a data file may be associated with a particular user and/or a particular communication device of the communication system. However, in order to simplify the concepts involved with the present invention, it shall be understood that the information extracted from database 101 by translator 105 is associated with a particular user, or users, when provided to database management system 106.

Figure 4:
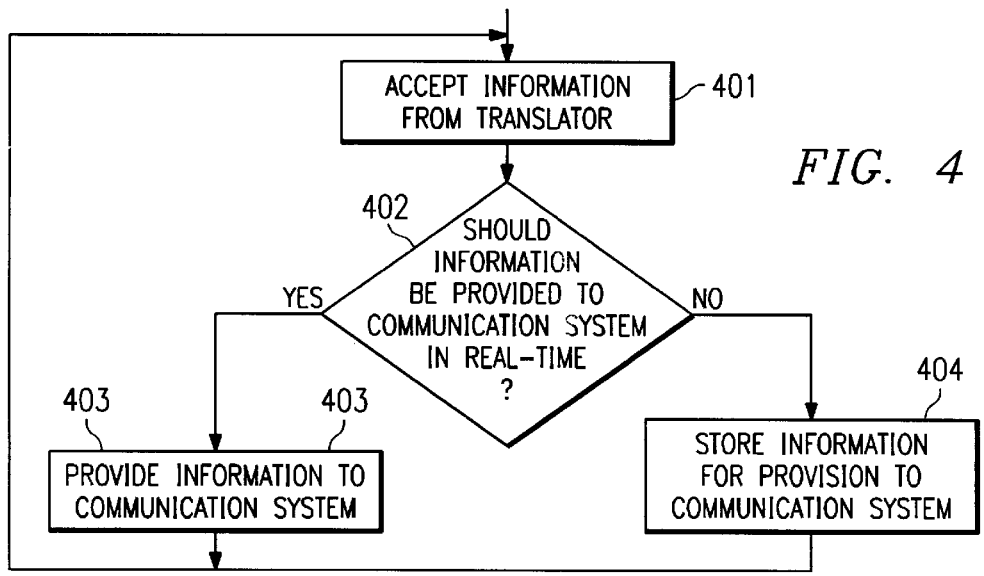
FIG. 4 is a flow diagram of the management of data according to a preferred embodiment of the present invention.

A preferred embodiment of the steps of database management system 106 is illustrated as a flow diagram in FIG. 4. At step 401, database management system 106 accepts information as provided by translator 105. Thereafter, at step 402 it is determined if the information provided by translator 105 should be provided to the communication system in real-time. Such a determination may be based on considerations as to the timeliness of the information. For example, where the information parsed from calendar 102 by translator 105 is relevant to the current operation of the communication system, the information may be immediately provided to the communication system (step 403). Such real-time information might include modification of a user's schedule to reflect their current attendance of a meeting and, thus, the need for calls to immediately be forwarded to a device other than an office extension.

However, where the information parsed from calendar 102 by translator 105 is relevant to, for example, a very distant date, it may not be desirable to immediately provide this information to the communication system. Conceivably, this information may be altered prior to its being relevant to the operation of the communication system. As such, its immediate provision to the communication system would require subsequent manipulation upon the information being changed. Similarly, the communication system may not be adapted to accept information with respect to operations at such a distant date. Therefore, database management system 106 may store this information within a database, such as database 108, for later provision to the communication system. Thereafter, database management system 106 may periodically retrieve information from database 108 in order to timely provide the information contained therein to the communication system.

Having been provided information with respect to a user being unavailable between the hours of 6:00 a.m. and 9:00 a.m., when the communication system receives a call for that particular user at, for example, 7:00 a.m. the call processing application would know that the user is unavailable, i.e., in a meeting, and would therefore presume that she/he did not want to be disturbed. Therefore, instead of routing the call through to the user's office phone number, the call processing application might direct the call to the user's voice mail.

Moreover, additional codes (not shown) could also be used to indicate whether a particular event could be interrupted by telephone calls. For example, the system could be instructed to always direct calls to voice mail during client meetings, but allow office calls during staff meetings.

The above example utilizes information requiring initialization correlating certain codes, or shorthand notations, with particular information in order to properly provide data to the communication system. However, it shall be appreciated that the correlation of information with respect to particular users need not be utilized. For example, the present invention may include the ability to generically determine, such as through the use of thesaurus type data, the meaning or significance of a particular entry in schedule 103. Thereafter, based upon this determination, the translator may provide particular information to the communication system. For example the entry "MTG," illustrated in schedule 103 of FIG. 1, may be interpreted to mean meeting through reference to thesaurus type data. Similarly, the entry "DAVID" may be referenced to a list of in-house users to determine that the meeting is with staff rather than a client. Accordingly, determinations as to the propriety of interrupting certain events could be determined without requiring additional information entry.

Additionally, database 108 may contain other information about each user. For example, information with respect to a preferred default device in the event of user unavailability could be provided through the use of a table such as routing table 112. Such call routing information may be utilized by the communication system directly or through periodic provision thereto by database management system 106, as discussed above.

In a preferred embodiment of routing table 112, particular devices to which calls should be forwarded are associated with specific blocks of time. These devices may include a primary device, as well as alternative routing for urgent calls and the like. For instance, between midnight and 6:00 a.m. voice mail may be the primary target for all calls, however, if there is an urgent call, it may be forwarded to the user's pager.

Additionally, routing table 112 may provide for routing to multiple devices in an attempt to contact a user. For example, between 6:00 a.m. and 8:00 a.m., the system may forward a call to the user's car phone, mobile phone and pager. These devices may be called sequentially or simultaneously. Alternatively, a caller may be prompted, such as through a voice response unit (VRU), as to which option the caller would prefer. Moreover, if these numbers are not successful in contacting the user, the system may direct the call to the user's voice mail.

It shall be appreciated that routing table 112 is provided as default routing information for use by the communication system in the absence of additional or superseding information. According to the present invention the call routing information, as provided to the communication system, is altered automatically when the PC based calendar application is updated. For example, if the user indicates on the electronic calendar that a particular meeting is scheduled between 9:00 a.m. and 10:00 a.m. for the current day, then calendar 102 and/or schedule 103 are changed. These changes are recorded in database 101 and are extracted, in real-time as described above, into the subscriber database management system 106. Thereafter, database management system 106 updates the information available to communication system applications 107, such as through communicating the information thereto or by updating the user information stored in database 108, as appropriate. The updating of routing table 112 to reflect the entries of schedule 103 are shown in the override column of routing table 112.

Additional information may also be stored in database 108. For example, a phone number directory, such as directory 111, may be associated with a user in order to provide a list of preferred or default phone numbers for use by the system. Directory 111 may contain a standardized list of commonly used phone numbers, such as the home, car, mobile phone and pager numbers shown. Alternatively, directory 111 could contain an arbitrary list of phone numbers selected by each user. Additionally, the list could include alternates such as vacation home, other cars, other offices or facsimile machine phone numbers and even e-mail addresses or the like.

Preferably, the phone numbers in directory 111 include a reference number, for example "#A", which allows the user to reference specific numbers such as by using a shorthand notation. The use of such a shorthand notation would obviate the need for the more lengthy labeling of the phone numbers using english language abbreviations. Of course, either or both methods may be utilized according to the present invention, if desired.

In addition to the use of directory 111 by routing table 112 for proper routing of a user's calls, directory 111 may also be utilized directly by a user. For example, a user may indicate that calls received during a particular event should be routed to a particular device irrespective of the default indication provided within routing table 112. Directing attention again to FIG. 1, schedule 103 includes a meeting scheduled from 6:00 a.m. to 9:00 a.m. A user may not wish calls received during this particular meeting to be routed as indicated in routing table 112, but may instead wish to be notified via pager.

According to the present invention, a user may designate a particular phone number or routing scheme that the communication system should use. In the example of FIG. 1, indicated between 6:00 a.m. and 9:00 a.m. on schedule 103, a meeting is scheduled with David. Additionally, the user has included the shorthand notation "#E" in the text of the event. Therefore, if a call for this particular user is received during the meeting with David, the call would be bypassed immediately to the pager as indicated by directory 111. Likewise, during lunch, scheduled between 12:00 p.m. and 13:00 p.m., the notation "#F" would cause the system to route calls to the user's voice mail directly.

In addition to the information provided by directory 111, a user may be permitted to indicate a specific location or phone number to which to direct a call. A particular alpha sequence, "#G" for example, followed by location or phone number information could be utilized to override default information such as that provided in routing table 112. Accordingly, a user could directly plug a telephone number into the text of the electronic calendar, i.e., "#G 555-1212," and the communication system would then route calls to that particular phone number during the associated period of time.

Moreover, this override information does not have to be a phone number. It could be another set of route preferences instead. For example, a code, such as "#H," could indicate a sequence that would forward calls to a car phone first, a mobile phone second, a pager third and then default back to voice mail.

Alternatively, the system might analyze the activity notations in order to determine a user's preferences. For example, an activity notation of "LUNCH" could cause all calls to be routed to voice mail, while meetings could cause all calls to be routed to pagers.

It shall be appreciated, therefore, that the user has not only been enabled to override the default device to which calls would otherwise be routed, but according to the present invention the user has been able to do so without the need to modify the operation of the PC based application.

Indeed, by simply making annotations in a PC based application, here an electronic calendar, the information is automatically extracted and translated by translator 105 and made available to subscriber database management system 106 in real-time so that call routing by the communication system is properly modified.

The use of notations within the schedule information provides an advantage in that the calling party's call may be efficiently routed without the caller having to listen to messages and make selections. Of course, a method could be provided in order to allow the caller override the call routing, such as by instructing the caller to push a certain sequence of buttons thereby being able to redirect the call to an alternate destination.

It should be noted that while a PC based application may be specifically adapted to handle call routing or other communication system functionality, the preferred embodiment of the present invention utilizes a general purpose PC based application, i.e., one not specifically adapted for communication system functions. As such, the present invention provides a transparent interface with currently existing information systems having only simple codes or notations associated with the information contained therein.

Moreover, as the information system is linked via the present invention to the communication system through database 101, it is also possible to provide information from the communication system to the information system, such as transferring information pertaining to calls incoming to a particular user into the PC based application. For example, in a simple simplest situation, an electronic calendar could be updated to show the number of calls that came in during any period of time for a particular user. Here a user accessing his or her calendar could see by a number next to a certain time that a certain number of calls have come in and, perhaps, even where they were routed. This allows a user to obtain information about the calls without requiring access to the communication system.

Furthermore, the two-way data exchange between database 101 and subscriber database management system 106, may be utilized to set up call management applications to perform functions like scheduling appointments via the telephone that would appear automatically on the appropriate user's calendar. For example, where a caller desires to set up an appointment with a user, a VRU application could be used to elicit a series of DTMF or voice responses in order to schedule appointments with a user. These responses could then be transitioned, through database management system 106 and translator 105, to update data file 104 automatically. This information would then appear on the appropriate user's calendar.

Eliciting information from a caller could be done by a series of interactive queries, such as the type of meeting the caller desires, the amount of time desired for the meeting, and then allowing the caller to select from blocks of time available for the particular type of meeting (it shall be appreciated that information with respect to the user's availability of time is available according to the present invention through reference to the user's electronic calendar).

Directing attention to FIG. 5, a typical call flow for allowing a caller to set an appointment is shown. The call may arrive at this call flow directly, or may be routed to the appointment call flow as a result of a condition, such as a desired user being unavailable. In a preferred embodiment, the caller is prompted with a number of call handling options (step 501). These options may include terminating the call, leaving a voice mail message for the user, paging the user, setting an appointment with the user and the like. Prompting the caller may include audibly announcing the options to the caller or any other form of prompting appropriate for the communication devices being utilized.

The caller's selection is accepted and a branching decision made as to how to properly handle the call (step 502). For example, where the caller chooses to leave a voice mail message, the call may be routed to a voice mail system as indicated at step 503. Similarly, where the caller chooses to terminate the call, the branching decision would result in an end of the call flow.

However, where the caller selects setting an appointment, the call flow proceeds with steps to negotiate an appointment. At step 504, the caller is prompted for information regarding the desired appointment. The script illustrated asks the caller to "please enter the time you would prefer." However, it shall be appreciated that eliciting appointment information may include information in addition to a time at which the appointment should occur. For example, the caller could be prompted as to a desired length of the appointment. A script for such a query might appear as "press 1 for 15 minutes, 2 for half an hour, and 3 for an hour." Additionally, a caller may be prompted as to a type of appointment desired. Such a query might be used to schedule similar appointments together, for example.

After prompting the caller for a preferred time, the system then accepts the caller's responses (step 505). For example, DTMF tones may be monitored to determine a date and time entered numerically by the caller. Of course, any number of means may be utilized to accept the caller's responses including voice recognition and the like.

Rather than eliciting from the caller a preferred appointment time, the system could operate to announce the time slots available for a particular user. However, it shall be appreciated that, for privacy reasons, it may not be desirable to announce a user's schedule to callers. Therefore, the preferred embodiment utilizes a dialogue which negotiates an appointment time nearest to a caller's chosen appointment time.

Having accepted the caller's preferences as to a desired appointment, this information is then compared with the user's available time slots (step 506). It shall be appreciated that, because the present invention provides access between the information system and the communication system, information such as times demarcated as available within the electronic calendar may be browsed. Therefore, the system may determine if the caller's desired time slot is available or, in the alternative, an available time slot nearest the caller's desired time slot.

Upon making a determination as to the availability of a particular time slot, a dialogue is presented to confirm that the user's available time is acceptable with the caller (step 507). If the caller is not amenable to the available time, the relevant call flow steps are repeated in order to negotiate an agreeable appointment time.

However, if the caller accepts the available appointment time, she/he is then prompted for an optional recorded message possibly including the caller's name and details as to the appointment. This recorded message may be attached to the appropriate calendar entry, such as where the information system provides for inclusion of sound information with the calendar program. Alternatively, through the use of voice recognition technology, the caller's message may be stored within the calendar as a data entry. Of course, in the alternative to, or in addition to, the above caller message, the system could utilize information available from automatic number information (ANI) in order to provide the user with information about the caller.

Upon successfully negotiating an appointment with a caller and eliciting any accompanying information, the system proceeds to update the user's calendar to reflect the appointment. The updating of the user's calendar is accomplished through the use of the translator discussed above in order to integrate the appointment information within the user's calendar file. In this way the system operates to designate on the calendar the appointment set via telephone.

Alternatively, the system could operate to maintain a queue of appointment requests rather than automatically updating a user's schedule. The user could then dialogue with the system and either confirm or decline appointments at will rather than allowing callers to arbitrarily fill up the user's calendar with appointments. In such a system the caller could leave a number, or the caller's number could be automatically determined through the use of ANI, for an appointment confirmation call back. Additionally, the caller's number could be put right into the calendar and the system automatically call back to confirm or the subscriber could call back to confirm, depending upon the configuration and the system leads.

Moreover, the present invention may be utilized to disseminate information via the communication system. For example, a user of the calendar application could call in and obtain information about appointments or scheduled events. Additionally, the user could schedule additional events through an interface similar to that described above for callers to schedule appointments. As such a user could retrieve calendar information, such as when and where a next meeting is to take place, and/or schedule appointments without actually having to directly access the information system.

Furthermore, through the integration of the information and communication systems, the present invention is capable of providing the user's information in any number of formats. For example, through the use of the above mentioned translator and database management systems, the present invention may provide a condensed view of the calendar information to the user's alphanumeric pager. Likewise, the information may be provided to the user by a facsimile device or e-mail system accessible by the communication or information system.

Moreover, dissemination of the user's information may be automatic, rather than upon the user's demand. For example, the system could be programmed to transmit to an alphanumeric pager every morning at six o'clock a condensed calendar of a user's events for that day.

Figure 6:
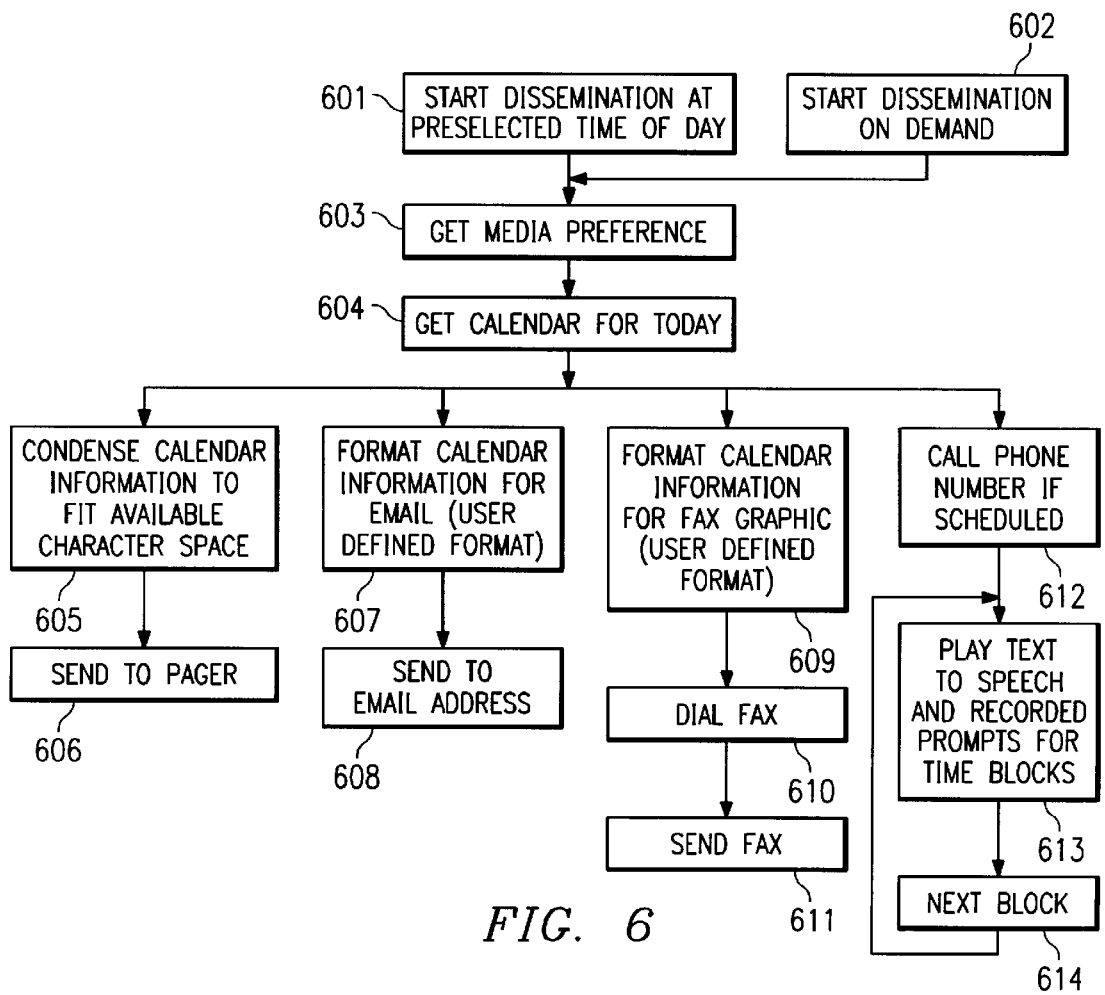
FIG. 6 is a flow diagram of the dissemination of information system data through the communication system according to a preferred embodiment of the present invention.

Directing attention to FIG. 6, a high level flow diagram for disseminating a user's calendar information is shown. As described above, the dissemination of the user's information may be initiated in a number of ways. Here, box 601 indicates that the dissemination has been automatically initiated at a preselected time of day. The information as to when to automatically disseminate information may be stored by the system such as within database 108 under control of database management system 106 described above. Relevant information stored in database 108 might include days and times for which dissemination is to occur, along with a device to which the dissemination is to occur. This information might also include user preferences as to the information to include in the dissemination as well as a desired format for the presentation of the information.

Box 602 indicates that the dissemination has been demanded by a user. The user may, for example, phone the communication system and, through the use of a voice response unit and associated dialogue, indicate that dissemination of information is desired.

Once the desire to have information disseminated is determined, the system operates to get the user's media preference (box 603). The user's media preference may be determined by the device through which the user is requesting dissemination, by querying the user, through reference to information stored in a database, or the like. Of course, the system may also operate to get other information relevant to the dissemination of information, such as a date for which information is desired, or identification of particular information to be disseminated.

Thereafter, the system operates to retrieve the relevant information for dissemination (box 604). This information may be retrieved directly from the information system, such as through the use of the translator described above, or may be retrieved from intermediate storage such as a database under control of the database management system described above.

Once the relevant data is available for dissemination, the system branches depending on the media preference selected by the user. Where dissemination via pager is selected, for example, the information is condensed, possibly using shorthand codes, in order to fit in the display space available to the pager (box 605). Thereafter, the system operates to transmit the information, such as by dialing the appropriate pager number and transmitting the information.

Condensing of the information is useful when being presented via pager as typically an alphanumeric pager only has approximately 256 characters in a pager packet. Alternatively, the information could be sent over a series of pages, in order to present the information in a richer format.

Where dissemination via e-mail is selected, the information is formatted for e-mail transmission (box 607). This format may be graphical or textual, depending on the particular e-mail system, and may include any number of user stylistic preferences. For example, the user may specify a columnar format for which information should be presented when in e-mail format and store this information for later use by the system. Once formatted, the information is sent to the proper e-mail address as indicated by the user (box 608).

Similarly, when dissemination is to occur by facsimile, the information is formatted for facsimile transmission (box 609). As facsimile devices transmit a digitized image, the system operates to convert the information into a form representative of a desired image. As with e-mail above, the user may specify preferences as to how this image should appear. For example, a rich graphic format, representative of a paper calendar with the information indicated thereon, could be utilized. Once formatted, the information is sent to a proper facsimile device through dialing the device (box 610) and transmitting the image (box 611).

Where audio dissemination of the information is desired, such as over a typical telephone, the system operates to connect to the proper communication device (box 612). Connection with the communication device may include dialing an appropriate phone number, awaiting an answer, and possibly even dialoging with the person answering to ensure that it is the user. Of course if the device is already connected, such as where the telephone through which a user is demanding the information is also the telephone through which the information is to be disseminated, the connecting step may be eliminated.

Once connection is established with the communication device, the system operates to audibly reproduce the information, such as through the use of text to speech technology, by playing a combination of text to speech and recorded prompts or messages (boxes 613 and 614). Of course, the information may not only include the information stored within a particular application, such as the aforementioned calendar, but may also include associated information. For example caller messages associated with particular appointments may be disseminated along with the relevant other information.

Although the present invention and its advantages have been described in detail, it should be understood that various changes, substitutions and alterations can be made herein without departing from the spirit and scope of the invention as defined by the appended claims.

What is claimed is:

1. A first system for providing data available within a second system for utilization within a third system, wherein one of said second and third systems includes a communication system and the other one of said second and third systems includes an information processing system, said first system comprising:

means for determining a portion of data available within said second system useful for utilization within said third system;

means for obtaining said determined portion of said data available within said second system, wherein said data obtained from said second system is associated with an application program unaffiliated with said third system;

means for manipulating said obtained data, wherein said manipulated data is formatted for provision to said third system;

means for providing said manipulated data to said third system; and means for integrating said provided data into data available within said third system.

2. The first system of claim 1, wherein said second system includes an information processing system and said third system includes a communication system.

3. The first system of claim 2, wherein said data provided to said third system is operable to modify the operation of said communication system.

4. The first system of claim 3, wherein said communication system includes an automatic call director, and wherein said operation modified by said data is routing of a call.

5. The first system of claim 2, wherein at least a portion of said data provided to said third system is passed to a caller utilizing said communication system.

6. The first system of claim 5, wherein said data as passed to said caller comprises a human understandable representation of said data stored in said second system.

7. The first system of claim 6, wherein said human understandable representation of data is formatted for reception by a communication device selected from the group consisting of:
 a telephone;
 a facsimile machine;
 an e-mail system; and
 an alphanumeric pager.

8. The first system of claim 6, further comprising:
 means for passing said human understandable representation to a telephone, a facsimile machine, an e-mail system, and an alphanumeric pager.

9. The first system of claim 2, wherein said application program is an electronic calendar.

10. The first system of claim 9, wherein said data obtained from said second system includes information with respect to a schedule stored by said electronic calendar.

11. The first system of claim 1, wherein said second system includes a communication system and said third system includes an information processing system, and wherein said data obtained from said second system is directed to an application program unaffiliated with said communication system.

12. The first system of claim 11, wherein said data provided to said third system is operable to modify a data file associated with said application program stored within said third system, and wherein said modified data file appears to have been modified by said application program.

13. The first system of claim 11, wherein said application program is an electronic calendar.

14. The first system of claim 11, wherein said data obtained from said second system includes information with respect to a schedule stored by said electronic calendar.

15. A method for providing data available within a first system for utilization within a second system, wherein one of said first and second systems includes a communication system and the other one of said first and second systems includes an information processing system, said method comprising the steps of:
 determining a portion of data available within said first system useful for utilization within said second system;
 obtaining said determined portion of said data available within said first system, wherein said data obtained from said first system is associated with an application program unaffiliated with said second system;
 manipulating said obtained data, wherein said manipulated data is formatted for provision to said second system; and
 providing said manipulated data to said second system; and
 integrating said provided data into data available within said second system.

16. The method of claim 15, wherein said data provided to said second system is operable to modify the operation of said communication system.

17. The method of claim 16, wherein said modified operation of said communication system includes the routing of calls.

18. The method of claim 15, further comprising the step of:
 passing said at least a portion of said obtained data to a user of said communication system.

19. The method of claim 18, wherein said passing step is operable to select a delivery device from at least a telephone, a facsimile machine, an e-mail system, and a pager.

20. The method of claim 15, wherein said application is an electronic calendar program.

21. The method of claim 15, wherein said application program is an electronic schedule.

22. An interface system for providing data stored within an information processing system to a communication system, wherein said stored data is associated with a particular application program which is unaffiliated with said communication system, said interface system comprising:
 means for determining what portion of said data stored within said information processing system is suitable for utilization within said communication system;
 means for acquiring at least a subset of said determined portion of said data stored within said information processing system;
 means for formatting said acquired data for provision to said communication system; and
 means for providing said formatted data to said communication system, wherein said provided data is associated with additional data available to said communication system.

23. The interface system of claim 22, further comprising:
 means for determining that said data stored within said information processing system has been modified, wherein said acquiring means and said formatting means are operable automatically with respect to said modified data.

24. The interface system of claim 22, wherein said data provided to said communication system is operable to alter an operational aspect of said communication system.

25. The interface system of claim 24, wherein said altered operational aspect modified by said data is selected from the group consisting of:
 call routing information; and
 communication device information.

26. The interface system of claim 22, wherein at least a portion of said data provided to said communication system is transmitted to a user of said communication system.

27. The interface system of claim 26, wherein transmission of said data is operable upon demand of said user of said communication system.

28. The interface system of claim 26, wherein transmission of said data is operable upon the occurrence of a preselected event as selected by a user of said information processing system.

29. The interface system of claim 26, wherein said data transmitted to said user results in a human understandable representation of said data stored in said information processing system.

30. The interface system of claim 29, wherein said human understandable representation of data is delivered by a communication device selected from the group consisting of:

a telephone;

a facsimile machine;

an e-mail system; and an alphanumeric pager.

31. The interface system of claim 29, further comprising:

means for transmitting said data to said user via a telephone, a facsimile machine, an e-mail system, and a pager.

32. The interface system of claim 22, wherein said application program is an electronic calendar.

33. The interface system of claim 32, wherein said data acquired from said information processing system includes information with respect to a schedule stored within said electronic calendar.

34. An interface system for providing data input into a communication system to an information processing system, wherein said input data is provided to said information processing system for association with a data file stored for use with a particular application program which is unaffiliated with said communication system, said interface system comprising:

means for eliciting said input data from a user of said communication system;

means for formatting said input data for provision to said information processing system;

means for determining a portion of said data file stored within said information processing system associated with said input data; and means for providing said formatted data to said information processing system, wherein said data provided to said information processing system is operable to modify said portion of said data file stored in said data file as determined by said determining means.

35. The interface system of claim 34, further comprising:

means for comparing at least a portion of said input data with said determined portion of said data stored within said information processing system, wherein said eliciting means operates to elicit input data as a function of said compared data.

36. The interface system of claim 34, wherein at least a portion of said input data elicited from said user includes data with respect to a schedule of a user of said information processing system.

37. The interface system of claim 34, wherein said application program is an electronic calendar.

38. The interface system of claim 37, wherein said eliciting means operates to negotiate an appointment for said user of said communication system with a user of said information processing system, and wherein said determined data is associated with a schedule of said user of said information processing system.

39. The interface system of claim 38, further comprising;

means for said user of said information processing system accepting said negotiated appointment, wherein said user of said information processing system selectively allows modification of a schedule recorded by said electronic calendar.

40. The interface system of claim 38, wherein said data file includes a schedule recorded by said electronic calendar associated with said user of said information processing system, and wherein said negotiated appointment is automatically inserted into said schedule.

\* \* \* \* \*